United States Patent
Levesque et al.

(10) Patent No.: US 10,095,311 B2
(45) Date of Patent: Oct. 9, 2018

(54) SYSTEMS AND METHODS FOR PROVIDING HAPTIC FEEDBACK VIA A CASE

(71) Applicant: Immersion Corporation, San Jose, CA (US)

(72) Inventors: Vincent Levesque, Montreal (CA); Danny Grant, Laval (CA); Razmik Mousakhanian, Kirkland (CA); Andry Rabemiarisoa, Lasalle (CA); Gor Isajanyan, Montreal (CA); Alex Zhu, Verdun (CA)

(73) Assignee: IMMERSION CORPORATION, San Jose, CA (US)

( * ) Notice: Subject to any disclaimer, the term of this patent is extended or adjusted under 35 U.S.C. 154(b) by 121 days.

(21) Appl. No.: 15/183,182

(22) Filed: Jun. 15, 2016

(65) Prior Publication Data
US 2017/0364154 A1    Dec. 21, 2017

(51) Int. Cl.
*G06F 3/01* (2006.01)
*G02B 27/01* (2006.01)
(Continued)

(52) U.S. Cl.
CPC ........... *G06F 3/016* (2013.01); *G02B 27/017* (2013.01); *G06F 1/163* (2013.01); *G06F 1/1637* (2013.01);
(Continued)

(58) Field of Classification Search
CPC ..... G06F 1/163–1/1637; G06F 1/1652–1/166; G06F 3/011; G06F 3/013; G06F 3/016; G06F 3/041; G09G 3/2003; G09G 5/08; G09G 5/10; G09G 5/14; G09G 5/34–5/346; G09G 5/37–5/377; G09G 2320/0626–2320/0653; G09G 2320/068; (Continued)

(56) References Cited

U.S. PATENT DOCUMENTS 6,160,540 A    12/2000  Fishkin et al.
6,339,419 B1    1/2002  Jolly et al.
(Continued)

FOREIGN PATENT DOCUMENTS

DE   10 2013 008 644 A1    11/2014
EP        2988200 A1     2/2016
(Continued)

OTHER PUBLICATIONS

Geometric Correction White Paper, Immersaview, Advanced Software Technologies, Beyond Boundaries, Mar. 2015, 5 pages.
(Continued)

*Primary Examiner* — Nathan Danielsen
(74) *Attorney, Agent, or Firm* — Kilpatrick Townsend & Stockton LLP

(57) ABSTRACT

One illustrative system disclosed herein includes a case configured to mechanically couple with a mobile device and position the mobile device such that the mobile device serves as a display for the case. The system also includes a processor coupled to the case and configured to generate a haptic signal based at least in part on a characteristic of the case. The system also includes a haptic output device in communication with the processor and configured to receive the haptic signal and output a haptic effect in response to the haptic signal.

27 Claims, 7 Drawing Sheets

(51) Int. Cl.
*G06F 1/16* (2006.01)
*G08B 6/00* (2006.01)
*G06F 3/041* (2006.01)
*G06T 19/00* (2011.01)

(52) U.S. Cl.
CPC ............ *G06F 1/1652* (2013.01); *G06F 3/041* (2013.01); *G06T 19/006* (2013.01); *G08B 6/00* (2013.01)

(58) Field of Classification Search
CPC ..... G09G 2340/10–2340/145; G09G 2354/00; G02B 27/017; G02B 27/0172; G02B 27/0176; G02B 2027/0118; G02B 2027/0174; G02B 2027/0178; G06T 19/00–19/20; G06T 7/408; G06T 7/0085; G06T 5/006; G06T 2200/32; G06T 2207/20024; G06T 2207/20221; G06T 2207/30168; H04N 5/2258; H04N 5/2259; H04N 5/23238; H04N 5/247; H04N 5/66; H04N 5/3415; H04N 2013/0074–2013/0092; H04N 5/265; H04N 5/235; G08B 6/00
See application file for complete search history.

(56) References Cited

U.S. PATENT DOCUMENTS

| | | |
|---|---|---|
| 6,477,448 B1 | 11/2002 | Maruyama |
| 8,531,485 B2 | 9/2013 | Birnbaum et al. |
| 8,834,272 B2 | 9/2014 | Bleich et al. |
| 9,317,121 B2 | 4/2016 | Park et al. |
| 9,606,625 B2 | 3/2017 | Levesque et al. |
| 9,851,805 B2 | 12/2017 | Levesque et al. |
| 2001/0035668 A1 | 11/2001 | Gaffney et al. |
| 2002/0097223 A1 | 7/2002 | Rosenberg |
| 2004/0008191 A1 | 1/2004 | Poupyrev et al. |
| 2004/0093968 A1 | 5/2004 | Oster |
| 2004/0108995 A1 | 6/2004 | Hoshino et al. |
| 2004/0164971 A1 | 8/2004 | Hayward et al. |
| 2006/0066574 A1 | 3/2006 | Kim et al. |
| 2008/0024440 A1 | 1/2008 | Olien et al. |
| 2008/0024463 A1 | 1/2008 | Pryor |
| 2008/0042986 A1 | 2/2008 | Westerman et al. |
| 2008/0143693 A1 | 6/2008 | Schena |
| 2008/0303782 A1 | 12/2008 | Grant et al. |
| 2009/0051509 A1 | 2/2009 | Hwang |
| 2009/0296341 A1 | 12/2009 | Eldershaw |
| 2010/0056223 A1 | 3/2010 | Choi et al. |
| 2010/0079356 A1 | 4/2010 | Hoellwarth |
| 2010/0149111 A1 | 6/2010 | Olien et al. |
| 2010/0177064 A1 | 7/2010 | Cragun |
| 2011/0115754 A1 | 5/2011 | Cruz-Hernandez |
| 2011/0128250 A1* | 6/2011 | Murphy .................. G06F 3/016 345/174 |
| 2012/0019440 A1 | 1/2012 | Berkley et al. |
| 2012/0056847 A1* | 3/2012 | Milford ................. G06F 1/3231 345/174 |
| 2012/0141949 A1 | 6/2012 | Bodony et al. |
| 2012/0176315 A1 | 7/2012 | Cordes et al. |
| 2012/0242462 A1 | 9/2012 | Nagara et al. |
| 2013/0022220 A1* | 1/2013 | Dong ...................... H04R 5/023 381/151 |
| 2013/0050112 A1 | 2/2013 | Vanhelle et al. |
| 2013/0201115 A1 | 8/2013 | Heubel |
| 2013/0314303 A1 | 12/2013 | Osterhout et al. |
| 2014/0056461 A1 | 2/2014 | Afshar |
| 2014/0173155 A1 | 6/2014 | Slattery |
| 2014/0229007 A1 | 8/2014 | Kishi |
| 2014/0242911 A1 | 8/2014 | Holtman et al. |
| 2014/0266647 A1 | 9/2014 | Visitacion et al. |
| 2014/0320431 A1 | 10/2014 | Cruz-Hernandez et al. |
| 2014/0354570 A1 | 12/2014 | Makinen et al. |
| 2015/0145656 A1 | 5/2015 | Levesque et al. |
| 2015/0253574 A1* | 9/2015 | Thurber ............. G02B 27/0172 359/630 |
| 2015/0316985 A1 | 11/2015 | Levesque et al. |
| 2015/0323993 A1 | 11/2015 | Levesque et al. |
| 2015/0339468 A1* | 11/2015 | Son ........................ G06F 21/31 726/19 |
| 2015/0347075 A1 | 12/2015 | Levesque et al. |
| 2015/0348327 A1* | 12/2015 | Zalewski .................. G06F 3/01 345/419 |
| 2016/0023245 A1* | 1/2016 | Zadesky ............... A61B 5/7455 310/334 |
| 2016/0028868 A1 | 1/2016 | Scholz et al. |
| 2016/0101716 A1 | 4/2016 | Brecht et al. |
| 2016/0103488 A1 | 4/2016 | Levesque et al. |
| 2016/0103489 A1 | 4/2016 | Cruz-Hernandez et al. |
| 2016/0140764 A1 | 5/2016 | Bickerstaff et al. |
| 2016/0161747 A1 | 6/2016 | Osterhout |
| 2016/0170508 A1 | 6/2016 | Moore et al. |
| 2016/0173667 A1 | 6/2016 | Torres Gutierrez et al. |
| 2016/0179128 A1 | 6/2016 | Guglielmo |
| 2016/0183364 A1* | 6/2016 | Choi ..................... G06F 1/1652 361/679.01 |
| 2016/0187988 A1 | 6/2016 | Levesque et al. |

FOREIGN PATENT DOCUMENTS

| | | | |
|---|---|---|---|
| JP | 2004-235687 | A | 8/2004 |
| JP | 2006-325323 | A | 11/2006 |
| JP | 2008-282125 | A | 11/2008 |
| WO | 2013/004919 | A1 | 1/2013 |
| WO | 2014/055436 | A1 | 4/2014 |
| WO | 2014/164018 | A1 | 10/2014 |
| WO | 2015/183621 | A1 | 12/2015 |

OTHER PUBLICATIONS

Stinson, So Smart: New Ikea App Places Virtual Furniture in your Home, Design, Wired, web page at http://www.wired.com/2013/08/a-new-ikea-app-lets-you-place-3d-furniture-in-your-home, as available via the Internet, 2013, 6pgs.
Google Cardboard, web page at https://vr.google.com/cardboard, as available via the Internet and printed Aug. 24, 2016.
Samsung, Gear VR, web page at https://en.wikipedia.org/wiki/Samsung_Gear_VR, as available via the Internet and printed Aug. 24, 2016.
European Patent Office Application No. 15200960, Extended European Search Report dated May 10, 2016, 10 pages.
European Patent Office Application No. 15200960, Examiner's Report dated Mar. 3, 2017, 6 pages.
European Patent Office Application No. 17275086.1, Extended European Search Report dated Jan. 29, 2018, 14 pages.
Buru-Navi : Being pulled illusion (Introduction movie), web site available at https://www.youtube.com/watch?v=Yj_WnNWV8F4, uploaded on Nov. 5, 2010.
Chubb, E. et al., ShiverPaD: A Glass Haptic Surface That Produces Shear Force on a Bare Finger. EEE Trans. Haptics 3, 3 (Jul. 2010), 189-198.
Dotson, K., Mophie Pulse Brings Shake, Rattle, and Roll to the iPod Touch, web page at http://siliconangle.com/blog/2011/01/06/mophie-pulse-brings-shake-rattle-and-roll-to-the-ipod-touch/, dated Jan. 6, 2011, 10 pages.
Mophie, Juice Pack Pulse, User Manual—Made for iPod touch 4$^{th}$ Generation, 2012, web page at www.mophie.com., 3 pages.
Poupyrev, I., Gummi, web page at http://www.ivanpoupyrev.com/projects/gummi.php, last downloaded on Dec. 12, 2014, 8 pages.
Roudaut, A. et al., Gesture output: eyes-free output using a force feedback touch surface. In Proceedings of the SIGCHI Conference on Human Factors in Computing Systems (CHI '13). ACM, New York, NY, USA, 2547-2556, 2013, 10 pages.
Sinclair, M. et al., "TouchMover 2.0—3D touchscreen with force feedback and haptic texture," Haptics Symposium (HAPTICS), 2014 IEEE, vol., No., pp. 1,6, Feb. 23-26, 2014, 6 pages.

(56) References Cited

OTHER PUBLICATIONS

Sinclair, M. et al., TouchMover: actuated 3D touchscreen with haptic feedback. In Proceedings of the 2013 ACM international conference on Interactive tabletops and surfaces (ITS '13). ACM, New York, NY, USA, 287-296, 2013, 10 pages.
European Patent Office Application No. 17275086.1, Partial European Search Report dated Oct. 25, 2017, 15 pages.

* cited by examiner

SYSTEMS AND METHODS FOR PROVIDING HAPTIC FEEDBACK VIA A CASE

FIELD OF THE INVENTION

The present disclosure relates to the field of user interface devices. More specifically, the present disclosure relates to providing haptic feedback via a case.

BACKGROUND

Virtual reality headsets and other virtual-reality based devices have grown in popularity. As dedicated virtual-reality devices increase in complexity and cost, consumers are looking for ways to obtain the virtual-reality experience through other, cheaper means. To fulfill this need, manufacturers have begun designing headset structures that are simply a frame to which users can attach their existing electronic devices, such as mobile phones, to provide the hardware to enable a virtual reality experience. Examples of such headset structures include, for example, Samsung Gear VR™, Zeiss VR One™, and Google Cardboard™, which each includes a frame into which a user can insert a mobile phone for use as a display and to provide other necessary hardware. It may be desirable to improve these headset structures through the use of haptic feedback. It can also be desirable to haptically-enable other kinds of cases for electronic devices.

SUMMARY

Embodiments of the present disclosure are related to providing haptic feedback via a case. In one embodiment, a system of the present disclosure may comprise a case configured to mechanically couple with a mobile device and position the mobile device such that the mobile device serves as a display for the case. The system may also comprise a processor coupled to the case and configured to generate a haptic signal based at least in part on a characteristic of the case. The system may also comprise a haptic output device in communication with the processor and configured to receive the haptic signal and output a haptic effect in response to the haptic signal.

In another embodiment, a mobile device of the present disclosure may comprise a housing, a display coupled to the housing, a memory, and a processor. The processor may be in communication with the memory and the display and disposed within the housing. The processor may be configured to receive a sensor signal from a sensor, and determine a characteristic of a case based on the sensor signal. The processor may also be configured to determine a haptic effect based on the characteristic of the case, and cause the haptic effect to be output by a haptic output device.

In another embodiment, a method of the present disclosure may comprise receiving a sensor signal from a sensor. The method may also comprise determining a characteristic of a case based on the sensor signal. The method may further comprise determining a haptic effect based on the characteristic of the case. The method may still further comprise causing the haptic effect to be output by a haptic output device. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
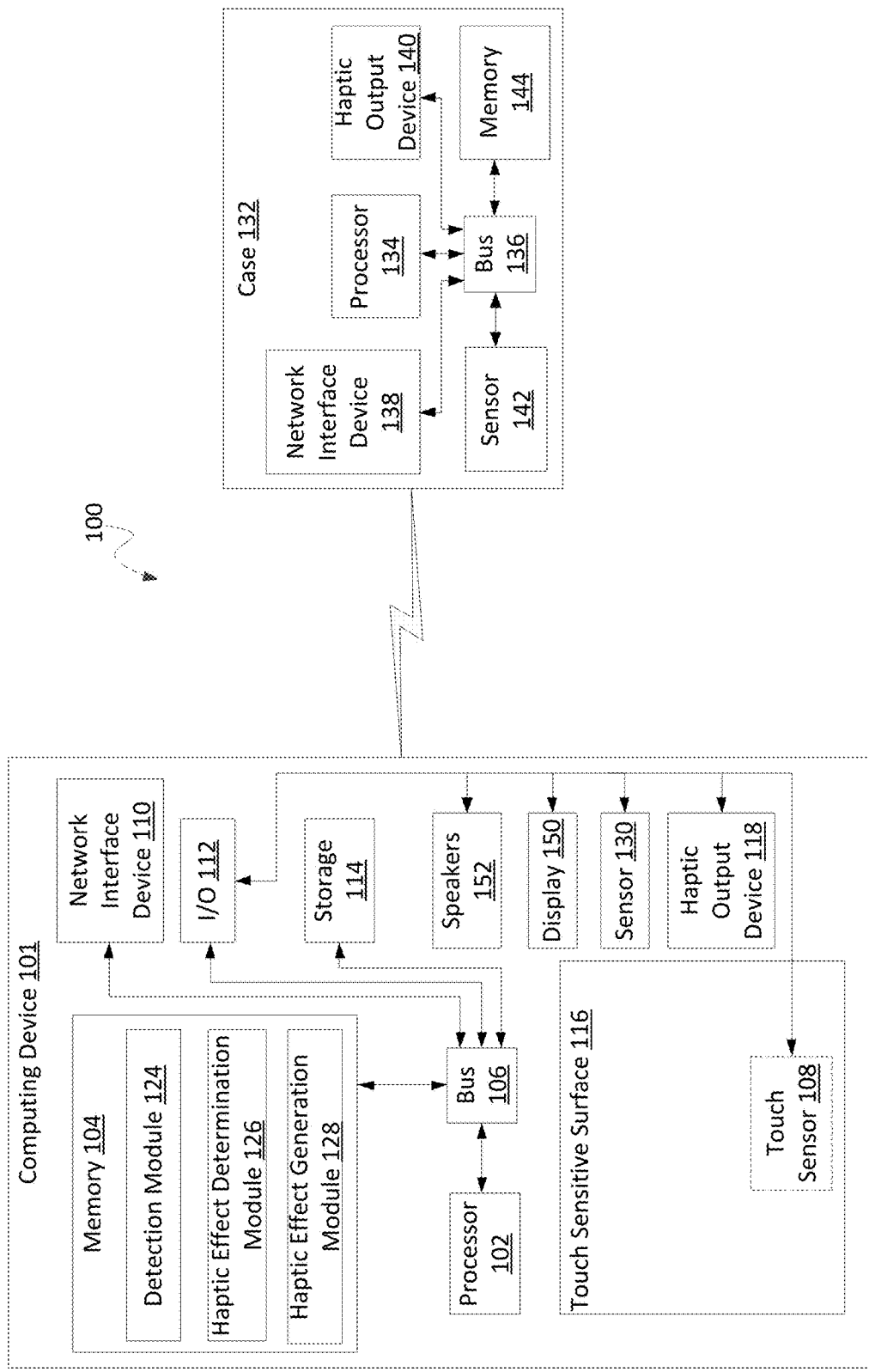
FIG. 1 is a block diagram showing a system for providing haptic feedback via a case according to one embodiment.

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Providing Haptic Feedback Via a Case

One illustrative embodiment of the present disclosure comprises a case that is separate from and configured to mechanically couple with an exterior (e.g., an outer housing of) an electronic device. In this embodiment, the case is a headset configured to be used in conjunction with a mobile device, such as a mobile phone, to provide a virtual experience (e.g., a virtual reality experience and/or an augmented reality experience) to a user. For example, the headset itself may not include a display. Rather, the headset may be configured to receive (e.g., removably couple with) the mobile device and position a display of the mobile device in front of a user's face to, e.g., provide visual and/or audio components of the virtual experience to the user.

In the illustrative embodiment, the case is configured to provide haptic feedback to the user to, e.g., enhance the virtual experience. The case comprises at least one haptic output device configured to output a haptic effect (e.g., to the user's head) in response to events occurring on the mobile device.

For example, the user may couple the mobile device to the headset, position the headset on the user's head, and initiate a video game (e.g., a virtual-reality video game). As the user plays the video game, the mobile device may detect one or more video game events, such as gun shots, explosions, punches, etc. In response to the video game events, the mobile device may transmit a signal (e.g., via a wired or wireless interface) to the headset. In the illustrative embodiment, the headset is configured to receive the signal and responsively cause the haptic output device to output a haptic effect. The haptic effect may be configured to simulate the video game event. For example, if the video game event comprises a user's virtual character being shot in the head, the headset may output a haptic effect configured to simulate a gunshot to the head, such as a strong vibration.

As another example, the user may use the headset and mobile device to watch a video. In some embodiments, the video comprises a 360-degree video recorded using an omnidirectional camera or a plurality of cameras. The user may be able to control the viewing angle or direction of the video, for example, by turning, tilting, or otherwise manipulating the user's head during playback of the video. As the video plays on the mobile device, one or more video events (e.g., thunderbolts, cars driving by, rocks falling from a cliff, etc.) may occur. In response to a video event, the mobile device may transmit a signal to the headset configured to cause the headset to output a haptic effect. For example, if the video event comprises a car slowly driving by, the headset may output a haptic effect configured to simulate the rumbling of a car engine, such as a low-frequency vibration.

As still another example, the user may couple the mobile device to the headset, position the headset on the user's head, and initiate an augmented-reality application. The augmented-reality application may cause a camera of the mobile device to capture images and display the images to the user, e.g., in real time. The user may perceive the camera images as if the user is looking through the mobile device. The augmented-reality application may also overlay one or more virtual objects overtop of the captured images. For example, as the user moves around a room, the mobile device may capture images of the room and display the images to the user with virtual furniture, a virtual avatar, and/or information overlaying the captured images. The mobile device may detect an interaction with a virtual object and, in response, output a haptic effect and/or transmit a signal to the headset configured to cause the headset to output a haptic effect. For example, the user may be able to reach out and touch a location in real space associated with a virtual object to interact with the virtual object. The mobile device may detect such a user interaction (e.g., via a sensor, such as the camera or a depth sensor) and, e.g., cause the headset to output a haptic effect associated with the user interaction. Additionally or alternatively, the mobile device may cause the headset to output a haptic effect in response to other events, such as a virtual object (e.g., a virtual avatar) virtually contacting a body part of the user (e.g., the user's head).

Another illustrative embodiment of the present disclosure comprises a mobile device configured for use with a case, such as the headset described above. In the illustrative embodiment, the mobile device comprises a sensor configured to detect a proximity of the mobile device to the case. For example, the mobile device may comprise a radio frequency identification (RFID) reader configured to detect a RFID tag coupled to the case when the mobile device is in close proximity to (e.g., coupled to) the case. The mobile device can determine, based on sensor signals from the sensor, whether or not the mobile device is coupled to the case.

In the illustrative embodiment, the mobile device is configured to determine one or more characteristics of a haptic effect based on whether or not the mobile device is coupled to the case. The characteristic(s) may comprise a type, magnitude, frequency, and/or duration of the haptic effect; a particular haptic-output device to use to output the haptic effect; and/or another characteristic.

For example, the mobile device may execute a video game. In response to detecting that the mobile device is not coupled to the case, the mobile device may itself output haptic effects associated with video game events via one or more on-board haptic output devices. In response to detecting that the mobile device is coupled to the case, the mobile device may (additionally or alternatively to outputting haptic effects itself) transmit signals to the case to cause the case to output haptic effects associated with video game events. Thus, the mobile device can control which haptic output device, or combination of haptic output devices, are used to output haptic effects based on whether or not the mobile device is coupled to the case.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Providing Haptic Feedback Via a Case

FIG. 1 is a block diagram showing a system 100 for providing haptic feedback via a case 132 according to one embodiment. The system 100 includes a computing device 101. The computing device 101 comprises a mobile device, such as a mobile phone (e.g., smart phone), tablet, e-reader, or a portable gaming device. The computing device 101 may or may not comprise all of the components depicted in FIG. 1. For example, in some embodiments, the computing device 101 may not comprise the sensor 130.

The computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

I/O components 112 may be used to facilitate connection to devices such as one or more displays 150, touch sensitive surfaces 116, keyboards, mice, speakers 152, microphones, buttons, and/or other hardware used to input data or output data. Storage 114 represents nonvolatile storage such as read-only memory, flash memory, ferroelectric RAM (F-RAM), magnetic, optical, or other storage media included in the computing device 101 or coupled to processor 102.

The computing device 101 may comprise a touch sensitive surface 116. In some embodiments, the touch sensitive surface 116 is flexible or deformable. Touch sensitive surface 116 represents any surface that is configured to sense tactile input of a user. One or more touch sensors 108 are configured to detect a touch in a touch area (e.g., when an object contacts a touch sensitive surface 116) and transmit signals associated with the touch to processor 102. Any suitable number, type, or arrangement of touch sensors 108 can be used. For example, in some embodiments, resistive and/or capacitive sensors may be embedded in touch sensitive surface 116 and used to determine the location of a touch and other information, such as pressure, speed, direction, and/or the proximity of a user's finger to the touch sensitive surface 116.

In some embodiments, the computing device 101 comprises a touch-enabled display that combines a touch sensitive surface 116 and a display 150 of the computing device 101. The touch sensitive surface 116 may correspond to the display exterior or one or more layers of material above components of the display 150. In other embodiments, touch sensitive surface 116 may not comprise (or otherwise correspond to) a display 150, depending on the particular configuration of the computing device 101.

In some embodiments, the computing device 101 comprises one or more sensor(s) 130. The sensor(s) 130 are configured to transmit sensor signals to the processor 102. The sensor(s) 130 may comprise, for example, a camera, microphone, accelerometer, humidity sensor, ambient light sensor, gyroscope, GPS unit, range sensor, depth sensor, biosensor, a strain gauge, and/or temperature sensor.

In some embodiments, the computing device 101 comprises a haptic output device 118 in communication with the processor 102. The haptic output device 118 is configured to output a haptic effect in response to a haptic signal. The haptic output device 118 may overlay a surface of the computing device 101, be disposed within the computing device 101, be a portion of a housing of the computing device 101, or any combination of these. In some embodiments, the computing device 101 comprises multiple haptic output devices 118 of the same or different type for producing haptic effects. The computing device 101 may actuate any combination of the haptic output devices 118 in sequence and/or in concert to generate one or more haptic effects.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), and/or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, increasing or reducing the perceived coefficient of an associated surface. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101. For example, the haptic output device 118 may comprise a conductive material. A high voltage can be applied to the conductive material to generate a capacitive coupling between the conductive material and an object (e.g., a user's finger or other body part, or a stylus) near or touching the haptic output device 118. Varying the levels of attraction between the object and the conductive material can vary the haptic effect perceived by a user.

In some embodiments, the haptic output device 118 comprises a deformation device configured to output a deformation haptic effect. The deformation haptic effect may comprise bending, folding, rolling, twisting, squeezing, flexing, changing the shape of, or otherwise deforming a surface associated with the computing device 101. For example, the deformation haptic effect may apply a force to a surface of the computing device 101, causing the surface (and/or the entire computing device 101) to bend, fold, roll, twist, squeeze, flex, change shape, and/or otherwise deform.

In some embodiments, the haptic output device 118 comprises fluid or gel configured for outputting a deformation haptic effect. For example, the haptic output device 118 may comprise a smart gel. The computing device 101 can apply a stimulus, such as an electric field, a magnetic field, a current, a voltage, and/or heat to the smart gel to cause the smart gel to deform in shape. This deformation in shape may cause a surface associated with the computing device 101 to deform (e.g., if the smart gel presses against the surface). As another example, the haptic output device 118 may comprise a rheological fluid, such as a magneto-rheological or electro-rheological fluid. A rheological fluid comprises metal particles (e.g., iron particles) suspended in a fluid (e.g., oil or water). To actuate the haptic output device 118, the computing device 101 may apply an electric or magnetic field to the rheological fluid. The electric or magnetic field may cause the order of the molecules in the fluid to realign, changing the overall damping and/or viscosity of the fluid. This may cause a surface of the computing device 101 to deform.

In some embodiments, the haptic output device 118 comprises a mechanical deformation device. For example, the haptic output device 118 may comprise an actuator coupled to an arm that rotates a deformation component. The deformation component may comprise, for example, an oval, starburst, or corrugated shape. The deformation component may be configured to move a surface associated with the haptic output device 118 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to deform a surface associated with the computing device 101.

For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 is deformed, for example, with a deforming mechanism (e.g., a motor coupled to wires), local deformation of materials, resonant mechanical elements, piezoelectric materials, micro-electromechanical systems ("MEMS") elements, or variable porosity membranes.

In some embodiments, the haptic output device 118 is configured to additionally or alternatively output other types of haptic effects. For example, the haptic output device 118 may be configured to output a haptic effect comprising a change in temperature by, e.g., heating or cooling a surface of the computing device 101. As another example, the haptic output device 118 may be configured to output an electro-tactile haptic effect, such as a stinging sensation. The haptic output device 118 may output the electro-tactile haptic effect by, e.g., stimulating a user's body part with electrical current and/or voltage.

Turning to memory 104, illustrative program components 124, 126, and 128 are depicted to illustrate how a device can be configured in some embodiments to provide haptic feedback via a case 132.

The detection module 124 represents a program component that causes the processor 102 to monitor sensor signals from the network interface device 110 and/or the sensor 130 and determine, based on the sensor signals, whether or not the computing device 101 is coupled to the case 132. For example, the detection module 124 may receive, via network interface device 110, a sensor signal associated with a wireless communication from the case 132. If the amplitude of the sensor signal exceeds a threshold, it may indicate that the computing device 101 is in very close proximity to, or coupled to, the case 132. Thus, the detection module 124 may determine an amplitude of the sensor signal and, in response to the amplitude exceeding a threshold, determine that the computing device 101 is coupled to the case 132.

Haptic effect determination module 126 represents a program component that analyzes data to select a haptic effect to generate. Particularly, haptic effect determination module 126 may comprise code that determines a haptic effect to output to the user. Further, haptic effect determination module 126 may comprise code that selects one or more haptic effects to provide, and/or one or more haptic output devices 118, 140 to actuate, in order to generate the haptic effect.

Haptic effect generation module 128 represents programming that causes processor 102 to generate and transmit a signal to a haptic output device 118, 140 to generate the selected haptic effect. For example, the haptic effect generation module 128 may access stored waveforms or commands to send to haptic output device 118 and/or haptic output device 140. As another example, haptic effect generation module 128 may comprise algorithms to determine the signal. In some embodiments, the haptic effect generation module 128 comprises algorithms to determine target coordinates for the haptic effect. These target coordinates may comprise, for example, a location on a user's body in which to output the haptic effect (e.g., a vibration).

Figure 2A:
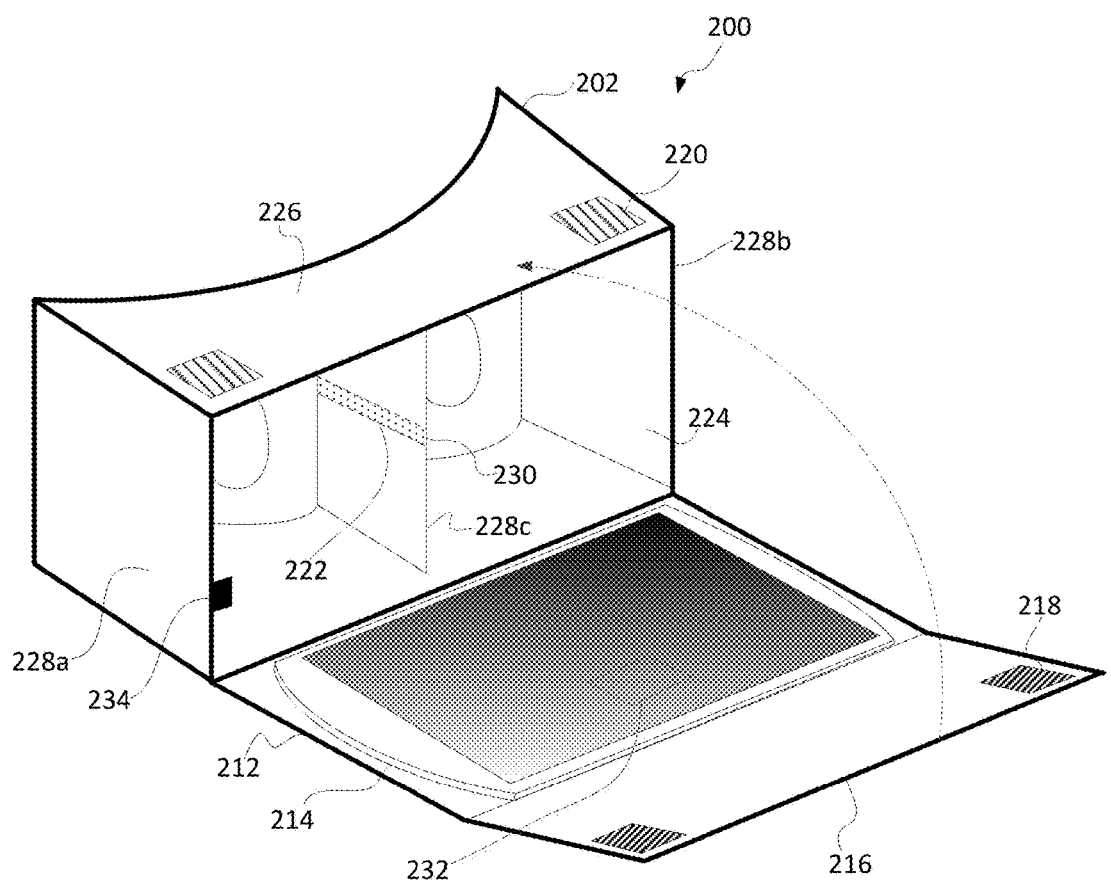
FIG. 2A shows a back perspective view of an embodiment of a case for providing haptic feedback.
Figure 2B:
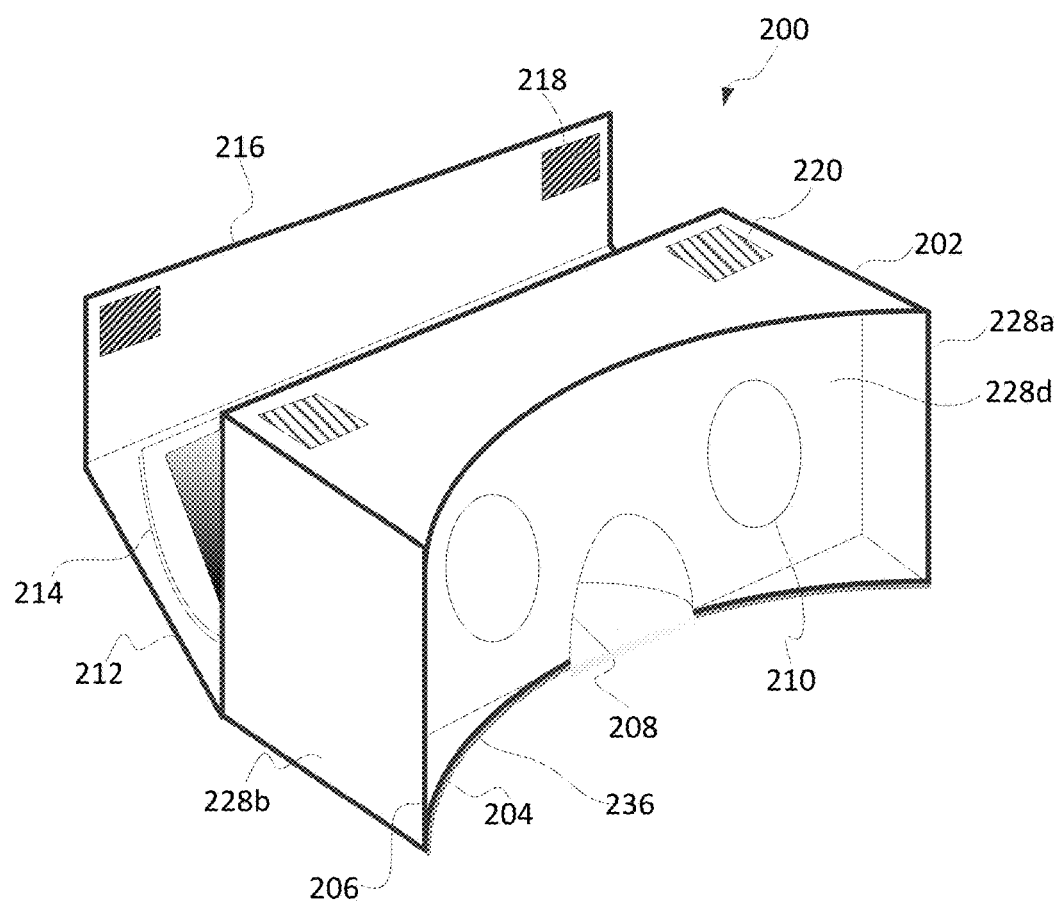
FIG. 2B shows a front perspective view of the embodiment shown in FIG. 2A.

The system 100 also comprises the case 132. The case 132 may comprise a headset (e.g., as shown in FIGS. 2A-B), goggles, glasses, and/or another a wearable device (e.g., a ring, headband, armband, wristband, strap, watch, piece of clothing, etc.). The case 132 is configured to mechanically (e.g., physically) couple the computing device 101 to the user's body (e.g., the user's leg, arm, shoulder, back, chest, and/or foot). For example, the case 132 is configured to couple with an outer housing of the computing device 101 and the user's body, thereby coupling the computing device 101 to the user's body.

The case 132 may be in wired or wireless communication with the computing device 101. As shown in FIG. 1, the case 132 may comprise a processor 134, a network interface device 138, a haptic output device 140, a sensor 142, a bus 136, and/or a memory 144. These components may be configured substantially similarly to, and/or include one or all of the features of, the processor 102, network interface device 110, haptic output device 118, sensor 130, bus 136, and/or memory 104, respectively. For example, the haptic output device 140 may be able to output any of the haptic effects using any of the techniques described above with respect to haptic output device 118. In other embodiments, the case 132 may or may not comprise all of the components depicted in FIG. 1. For example, in some embodiments, the case 132 may not comprise the sensor 142 and/or the memory 144.

In some embodiments, the case 132 is configured to output one or more haptic effects in response to events occurring on the computing device 101. For example, the computing device 101 may be playing a video or outputting other content. In response to an event occurring in the video, such as a car crash, the computing device 101 may transmit one or more signals (e.g., via the network interface device 110) to the case 132. The case 132 may receive the signals (e.g., via the network interface device 139) and, based on the signals, cause the haptic output device 140 to output a haptic effect. The haptic effect may be configured to simulate the event occurring in the video, e.g., the car crash.

FIGS. 2A-B show an embodiment of a case 200 for providing haptic feedback. In the embodiment shown in FIG. 2A, case 200 is a headset. The case 200 comprises a housing 202 (e.g., a frame). The housing 202 is configured to provide structural support to the case 200.

In some embodiments, the housing 202 comprises a receptacle 224 for receiving a computing device 214. The receptacle 224 may comprise a gap or opening into which the computing device 214 can be inserted or positioned. In such an embodiment, the housing 202 may comprise one or more flaps 212, 216 for removably coupling the computing device 214 to the housing 202. For example, to couple the computing device 214 to the case 200, a user can position the computing device 214 as shown in FIG. 2A, and pull the flaps 212, 216 in the direction shown by the dashed arrow (e.g., and also partially illustrated in FIG. 2B). Thereafter, the user can attach the flap 216 to a top surface 226 of the housing 202 via coupling devices 218, 220 (e.g., Velcro™, screws, bolts, tape, etc.) to secure the computing device 214 to the case 200. To remove the computing device 214 from the case 200, the user can decouple the coupling devices 218, 220 and lower the flap in a direction opposite to the direction of the dashed arrow.

In some embodiments, the flap 212 may comprise one or more holes and/or cutouts so that the flap 212 does not block a capture area of a camera and/or another sensor of the computing device 214. For example, the flap 212 may comprise a hole positioned so that a view area of the camera of the computing device 214 (e.g., positioned in the back of the computing device 214) is not impeded. This may enable the computing device 214 to be used for, e.g., an augmented-reality experience.

In some embodiments, the housing 202 comprises additional or alternative mechanisms for removably coupling the computing device 214 to the housing 202. For example, the housing 202 may comprise one or more clamps, bolts, screws, springs, elastic bands, latches, grooves, and/or other coupling devices for attaching the computing device 214 to the housing 202. In some embodiments, after pulling the flaps 212, 216 in the direction shown by the dashed arrow, a user may couple another component to the flap 212 to further secure the flap 212, and thus the computing device 214, in position. For example, the housing 202 may comprise a cord (e.g., an elastic band) and/or another component (e.g., a piece of plastic) configured to be coupled between surfaces 228a, 228b, and behind the flap 212, to secure the flap 212 in position.

In some embodiments, the housing 202 may not comprise the flaps 212, 216. For example, in one embodiment, the housing 202 may comprise one or more grooves into which the computing device 214 can be positioned for coupling the computing device 214 to the housing 202. Additionally or alternatively, the housing 202 may comprise one or more clamps or other devices configured to mechanically grasp the computing device 214 for coupling the computing device 214 to the housing 202. Additionally or alternatively, the housing 202 may comprise a cord or other component configured to be coupled between at least two surfaces 228a, 228b of the housing 202. The computing device 214 may be positioned in the receptacle 224, and then the component may be coupled to the surfaces 228a, 228b to secure the computing device 214 in position. The housing 202 may comprise any number and combination of coupling devices for removably coupling the computing device 214 to the case 200.

Turning now to FIG. 2B, in some embodiments, the case 200 comprises an inner surface 228d, e.g., separating the user's face from the computing device 214. The inner surface 228d may provide additional structural support to the case 200. One or more holes 210 can be formed through the inner surface 228, e.g., to allow a user to view a display screen of the computing device 214. Alternatively, in some embodiments, the case 200 may not comprise an inner surface 228d separating the user's face from the computing device 214. In such an embodiment, the case 200 may not comprise the holes 210.

In some embodiments, the case 200 comprises one or more interface surfaces 204, 206, 208 configured to contact a user's face. For example, the case 200 may comprise an interface surface 208 configured to provide space for and/or contact the user's nose. The case 200 may additionally or alternatively comprise interface surfaces 204, 206 configured to contact other portions of the user's face. The interface surfaces 204, 206, 208 may comprise curvatures to, e.g., improve comfort and contour the case 200 to the user's face.

Further, the case 200 comprises one or more attachment devices for coupling the case 200 to the user's head. For example, the housing 202 may comprise a cord or band coupled on either end to a surface of the housing 202 (e.g., surfaces 228a, 228b) and configured to be wrapped around a portion of (e.g., the back of) the user's head.

To use the case 200, the user may couple the computing device 214 to the case 200, position the case 200 on the user's head, and view content (e.g., a video game, a movie, a video, etc.) output on the display of the computing device 214, e.g., via the holes 210. The user may additionally or alternatively be able to hear sound output via speakers of the computing device 214. In some embodiments, the computing device 214 may further output haptic effects in response to events occurring on the mobile device, such as events associated with the content output on the display. The video, audio, and/or haptic effects may provide an entertaining experience to the user.

In some embodiments, the case 200 is configured to improve or optimize haptic effects output by the computing device 214. For example, referring back to FIG. 2A, the case 200 may comprise a material 222. The material 222 may comprise metal, rubber, hard plastic, and/or another stiff material. Although the material 222 is positioned on an interior surface 228c of the housing 202 in the embodiment shown in FIG. 2A, in other embodiments, the material 222 may be positioned in additional or alternative areas of the housing 202. In some embodiments, the stiffness of the material 222 may more efficiently propagate vibrations (e.g., output by the computing device 214 as haptic effects) than other materials, such as cardboard or soft plastics. Thus, haptic effects output by the computing device 214 may propagate more efficiently through the case 200. This may provide a more realistic and/or satisfying haptic experience to the user.

In some embodiments, the material 222 is configured to resonate at a frequency substantially similar to a frequency of vibrations output by the computing device 214. The resonance characteristics of the material 222 may amplify and/or more efficiently propagate vibrations output by the computing device 214. For example, the material 222 may be configured to resonate at, and/or efficiently propagate vibrations with a frequency of, 125 Hz. Thus, 125 Hz vibrations output by the computing device 214 may be amplified or more efficiently propagated due to the resonance of the material 222. This amplification may provide a more intense haptic experience to the user.

In some embodiments, the material 222 is configured to form an interface between the computing device 214 and the housing 202. For example, the material 222 can be positioned for contacting both the housing 202 and the computing device 214. In one such embodiment, a surface 230 of the material 222 can be positioned within the receptacle 224 for contacting the computing device 214 when the computing device 214 is positioned in the receptacle 224. By contacting (e.g., directly contacting) the computing device 214, the material 222 may more efficiently receive and propagate haptic effects output by the computing device 214 to the housing 202, and thus to the user.

In some embodiments, the housing 202 is configured to localize a haptic effect to a particular area of the user's body. For example, housing 202 may comprise one or more dampening materials configured to dampen vibrations (e.g., output by the computing device 214). The housing 202 may also comprise the material 222, which may be configured to propagate vibrations through the housing 202 to the particular area of the user's body. For example, at least a portion of the material 222 may be positioned for contacting the user's forehead and transmitting vibrations to the user's forehead. In such an example, the material 222 may allow vibrations output by the computing device 214 to be transmitted to the user's forehead, while the dampening materials may reduce the amplitude of the vibrations propagating through the housing 202 to other locations of the user's head. Thus, the user may primarily (or only) perceive the vibrations at the user's forehead, providing a localized haptic experience.

In some embodiments, the material 222 is positioned to contact the computing device 214 and an interface surface (e.g., interface surface 204, 206, 208). For example, the material 222 may comprise a pin or rod extending through the housing 202. A first end of the material 222 may be configured to contact the computing device 214, and a second end of the material 222 may be configured to contact the interface surface (and/or the user). For example, the second end of the material 222 may comprise a spring-loaded pin or rod configured to press (e.g., directly press) against the user's face. In such an embodiment, the material 222 may form a direct, or substantially direct, transmission path between the computing device 214 and the user through which haptic effects, such as vibrations, can propagate. This may improve the user's haptic experience. This may also provide a haptic effect that is localized to a particular area of the user's body, for example, a haptic effect that is primarily (or only) perceivable by the user at the location in which the material 222 contacts the user's face.

In some embodiments, the material 222 is positioned to contact a surface of the computing device 214 associated with (e.g., proximate to) a haptic output device 232 of the computing device 214. For example, the material 222 may be configured to contact a surface of the computing device 214 positioned overtop of (e.g., directly over top of) a haptic output device 232 disposed within or otherwise coupled to the computing device 214. By contacting a location close to where a haptic effect originates from the computing device 214, the material 222 may more efficiently receive haptic effects output by the computing device 214 and/or propagate the haptic effects to a user. For example, haptic effects output by the haptic output device 232 may undergo less damping and/or distortion (e.g., due to the characteristics of the computing device 214 and/or the case 200) before being received by the material 222 and propagated to the user.

In some embodiments, the housing 202 comprises one or more fastening components 234 configured to firmly grip and/or couple with the computing device 214 (e.g., to grip and/or couple to the computing device 214 with an amount of force above a threshold). A fastening component 234 may comprise a clamp, screw, spring, bolt, latch, elastic band or other elastic component, cord, a groove in which the computing device 214 can be positioned, or any combination of these. In some embodiments, the fastening component 234 may be included within or comprise a coupling device for removably coupling the computing device 214 to the case 200. The fastening component 234 may be positioned in any suitable location for firmly gripping and/or coupling the housing 202 to the computing device 214. The firm grip and/or coupling can improve the transmission of haptic effects, such as vibrations, from the computing device 214 to the housing 202, and thus the user.

In some embodiments, an interface surface (e.g., interface surfaces 204, 206, 208) of the case 200 is configured to improve the transmission of haptic effects from the case 200 to the user. For example, referring back to FIG. 2B, an interface surface 204 may comprise and/or be coupled to a material 236. The material 236 may comprise a rigid foam, a hard plastic, a metal, a hard rubber, and/or another rigid material. The material 236 may be configured to conform to the contour of the user's face and/or provide a rigid transmission path through which vibrations can propagate from the housing 202 to the user. Such rigid materials may more efficiently propagate haptic effects (e.g., vibrations) than other materials, such as cardboard or soft plastics. Additionally or alternatively, an interface surface may comprise rigid components, such as spring-loaded rods or pads, configured to press against a user's face and transmit vibrations to the user. Any number and combination of interface surfaces may comprise the material 236, rigid components, and/or other devices for improving the transmission of haptic effects from the case 200 to the user.

The embodiment shown in FIGS. 2A-B is merely provided as an example of a case 200. Other embodiments may comprise more or fewer components arranged in the same or different configurations, e.g., for positioning a computing device 214 in front of a user's face and/or providing an enhanced haptic experience.

Illustrative Methods for Providing Haptic Feedback Via a Case

Figure 3:
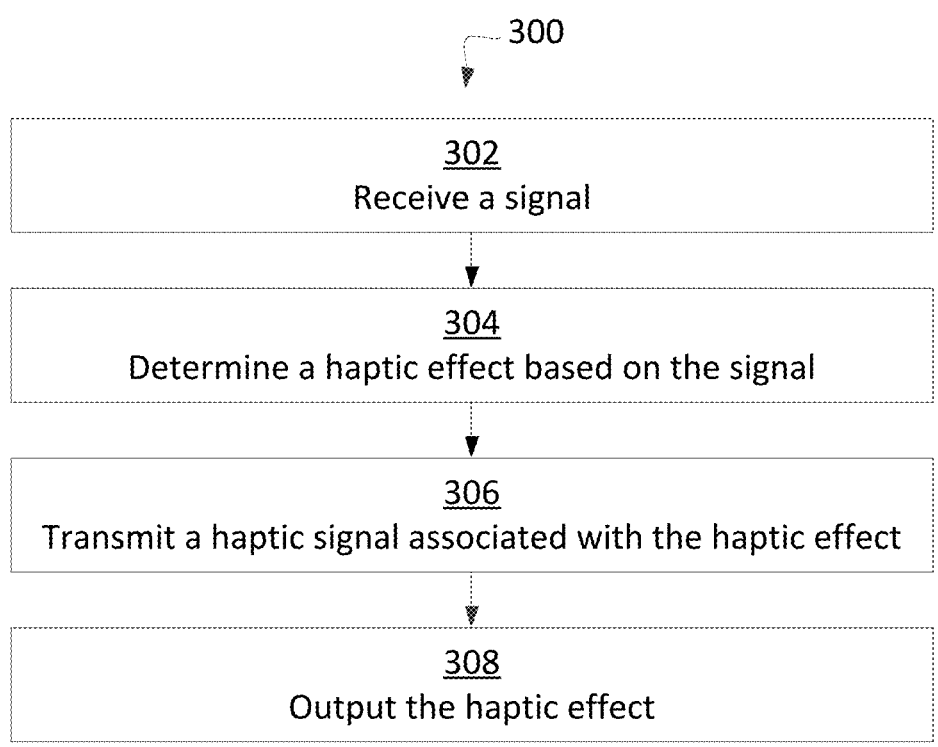
FIG. 3 is a flow chart of steps for providing haptic feedback via a case according to an embodiment.

FIG. 3 is a flow chart of steps for providing haptic feedback via a case according to an embodiment. In some embodiments, the steps in FIG. 3 may be implemented in program code that is executed by a processor, for example, the processor in a general purpose computer, a mobile device, or a server. In some embodiments, these steps may be implemented by a group of processors. In some embodiments one or more steps shown in FIG. 3 may be omitted or performed in a different order. Similarly, in some embodiments, additional steps not shown in FIG. 3 may also be performed. The steps below are described with reference to components shown in FIG. 1.

The method 300 begins at step 302 when a processor 134 of the case 132 receives a signal. The signal may be associated with a haptic effect, audio, video, and/or other output from the computing device 101.

In some embodiments, the signal is from a sensor 142. For example, the computing device 101 may be coupled to the case 132 and executing a video game. In response to a video game event, the computing device 101 may output a vibration. Because the computing device 101 is coupled to the case 132, the vibration may propagate through the case 132 and be detected by the sensor 142. The sensor 142 may then transmit sensor signals associated with the vibration to the processor 134. Further, in some embodiments, the case 132 may determine one or more haptic effects based on the vibration. For example, the processor 134 may determine that an amplitude of the vibration is below a desired threshold for providing a particular haptic effect to a user. The amplitude of the vibration may be below the threshold, e.g., due to dampening from a material within the case 132 and/or computing device 101. Based on the amplitude of the vibration being below the threshold, the case 132 may output one or more vibrations via the haptic output device 140 to, e.g., supplement or replace the haptic effect output by the computing device 101.

As another example, in some embodiments, the computing device 101 is outputting a video (e.g., a movie) or other content. The sensor 142 may comprise a microphone and/or camera (e.g., oriented toward the computing device 101) configured to detect and transmit audio data and/or video data to the processor 134. In some embodiments, the processor 134 is configured to analyze audio and/or video data to determine an event associated with the content, such as a car zooming down the road in a car-chase scene of the video. Further, the processor 134 may determine one or more haptic effects associated with the event and output the haptic effects via the haptic output device 140. For example, the processor 134 may determine a haptic effect comprising a rumble sensation configured to, e.g., simulate a car engine, and cause the rumble sensation to be output via the haptic output device 140. Thus, in some embodiments, the case 132 can provide an enhanced haptic experience to the user, e.g., even if the computing device 101 is not in wired or wireless communication with the case 132.

In some embodiments, the signal is transmitted (e.g., wirelessly) from the computing device 101. The signal may be associated with an event occurring on the computing device 101. For example, the computing device 101 may output a video. In response to an event occurring in the video, the computing device 101 may transmit a signal associated with the event to the case 132. As another example, the computing device 101 may output a virtual reality interface comprising virtual buttons, sliders, knobs, icons, and/or other user interface components. In response to an event comprising a user interaction with a virtual user interface component, the computing device 101 may transmit a signal associated with the event to the case 132. The signal may be configured to cause the case 132 to output a haptic effect, such as a haptic effect configured to simulate the event and/or a haptic effect configured to supplement or replace a haptic effect output by the computing device 101.

The method 300 continues at step 304 when the processor 134 of the case 132 determines a haptic effect based on the signal. In some embodiments, the processor 134 is configured to access a lookup table stored in memory 144 to map one or more characteristics of the signal (e.g., the magnitude, duration, frequency, waveform, and/or data carried by the signal) to one or more haptic effects. For example, in the above embodiment in which the sensor is configured to detect vibrations output by the computing device 101, the processor 134 may map one or more characteristics of the detected vibrations to a particular haptic effect, e.g., to determine which haptic effect the computing device 101 output. The processor 134 may then map the particular haptic effect to one or more other haptic effects to output via the haptic output device 140, e.g., to supplement or replace the haptic effect output by the computing device 101.

As another example, in the above embodiment in which the sensor is configured to detect audio and/or video, the processor 134 may access a lookup table to map one or more audio and/or image characteristics to a particular haptic effect. For instance, the processor 134 may map a high-amplitude sound to a haptic effect comprising, e.g., a high-magnitude vibration. As another example, the processor 134 may map content of an image, e.g., the presence of a vehicle, to a particular haptic effect, such as the rumble sensation.

In some embodiments, the processor 134 may apply data from the signal to one or more algorithms to determine one or more associated haptic effects. In such an embodiment, the processor 134 may use an algorithm to determine a haptic effect based on an amplitude, frequency, duration, and/or other characteristic of the signal. For example, a material of the case 132 may dampen vibrations output by the computing device 101 (e.g., by a known amount) as the vibrations propagate through the case 132. The sensor 142 may detect the dampened vibrations and transmit an associated signal to the processor 134. Based on the signal, the processor 134 may determine that the amplitude of the vibrations are below a desired threshold (e.g., due to the dampening of the vibrations), and determine a haptic effect configured to correct for the dampened vibrations. The processor may then cause the haptic effect to be output.

The method 300 continues at step 306 when a processor 134 of the case 132 transmits a haptic signal associated with the haptic effect. In some embodiments, the processor 134 may access drive signals stored in memory 144 and associated with particular haptic effects to determine the haptic signal. In one embodiment, a haptic signal is generated by accessing a stored algorithm and inputting parameters associated with an effect. For example, in such an embodiment, an algorithm may output data for use in generating a drive signal based on amplitude and frequency parameters. As another example, a haptic signal may comprise data to be decoded by the haptic output device 140. For instance, the haptic output device 140 may itself respond to commands specifying parameters such as amplitude and frequency.

The method 300 continues at step 308 when a haptic output device 140 receives the haptic signal and outputs the haptic effect. The haptic output device 140 may output one or more haptic effects comprising textures, vibrations, changes in a perceived coefficient of friction, changes in temperature, stroking sensations, stinging sensations, and/or surface deformations (e.g., of a surface of the case 132).

Figure 4:
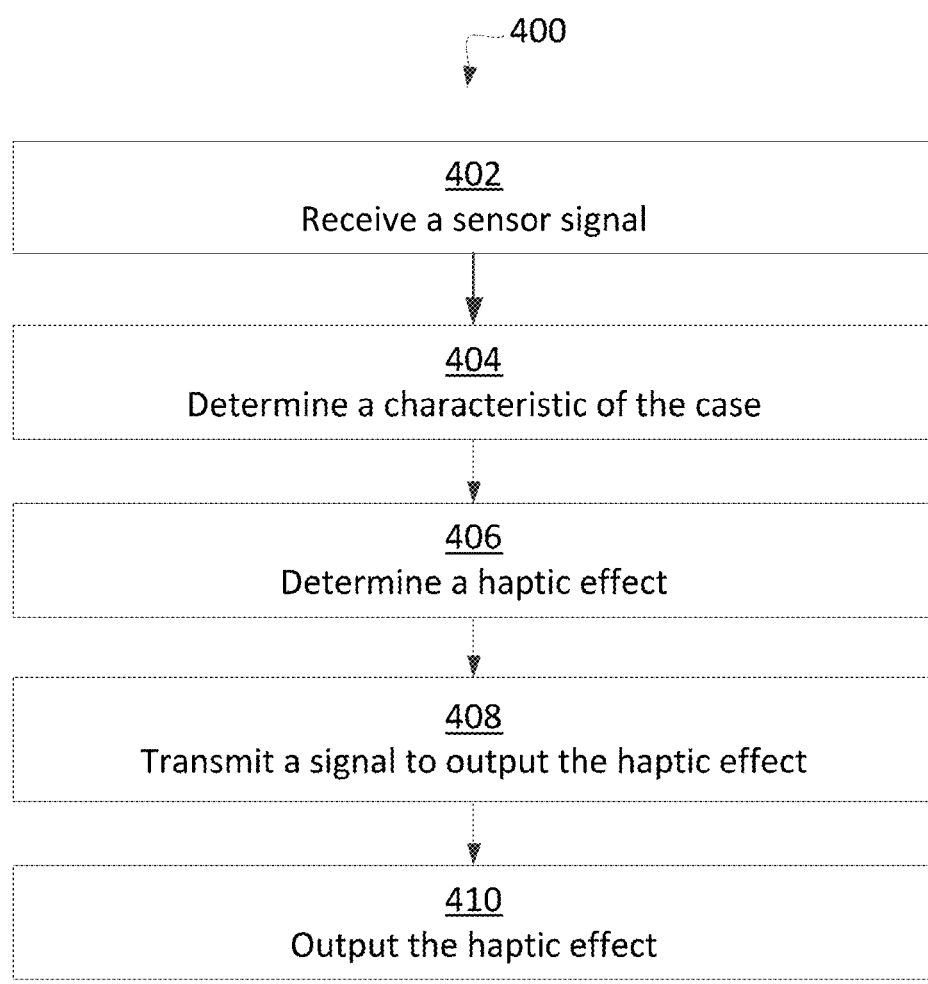
FIG. 4 is a flow chart of steps for providing haptic feedback via a case according to another embodiment.

FIG. 4 is a flow chart of steps for providing haptic feedback via a case according to another embodiment. In some embodiments, the steps in FIG. 4 may be implemented in program code that is executed by a processor, for example, the processor in a general purpose computer, a mobile device, or a server. In some embodiments, these steps may be implemented by a group of processors. In some embodiments one or more steps shown in FIG. 4 may be omitted or performed in a different order. Similarly, in some embodiments, additional steps not shown in FIG. 4 may also be performed. The steps below are described with reference to components shown in FIG. 1.

The method 400 begins at step 402 when a processor 102 of the computing device 101 receives a sensor signal from a sensor (e.g., sensor 130 and/or network interface device 110).

In some embodiments, the sensor signal indicates an attachment status, e.g., whether or not the computing device 101 is attached and/or coupled to the case 132. For example, the sensor may comprise a button configured to be pressed when the computing device 101 is coupled to the case 132. In response to the computing device 101 being coupled to the case 132, and the button being pressed, the sensor may transmit a sensor signal indicating the button was pressed. The computing device 101 can determine, based on the sensor signal, that the computing device 101 is coupled to the case 132.

As another example, the sensor may comprise an electrode configured to contact another electrode positioned on the case 132. The sensor may detect a contact between the electrodes and transmit an associated sensor signal to the processor 102. The processor 102 can determine, based on the sensor signal, that the computing device 101 is coupled to the case 132.

As still another example, the sensor may comprise a RFID reader configured to read a RFID tag positioned on the case 132 when the computing device 101 is coupled to the case 132. In response to the computing device 101 being coupled to the case 132, the sensor may transmit a sensor signal associated with the RFID tag. The processor 102 can determine, based on the sensor signal, that the computing device 101 is coupled to the case 132.

As yet another example, the sensor may be configured to detect an amplitude of a wireless signal (e.g., a Bluetooth or radio signal) communicated between the computing device 101 and the case 132. The sensor may transmit a sensor signal associated with the amplitude of the wireless signal to the processor 102. In response to the amplitude exceeding a threshold, processor 102 may determine that the computing device 101 is coupled to the case 132. Any number and combination of sensors and/or sensor signals can be used to determine whether the computing device 101 is coupled to the case 132.

The method 400 continues at step 404 when the processor 102 of the computing device 101 determines a characteristic of the case 132. The processor 102 of the computing device 101 may determine the characteristic of the case 132 based at least in part on the sensor signal. The characteristic may comprise, for example, a model, manufacturer, hardware component (e.g., a type of haptic output device 140 that the case 132 has), a location of a hardware component (e.g., a location of a haptic output device 140 within or on the case 132), a software component (e.g., haptic software of the case 132), a location on a user's body in which the haptic output device 140 is configured to output a haptic effect, an attachment status, and/or another feature of the case 132.

In some embodiments, the processor 102 determines the characteristic of the case 132 via a lookup table. For example, the processor 102 may access a lookup table and map a particular RFID tag associated with a particular case 132 to a model, manufacturer, and/or other characteristic of the case 132.

In some embodiments, the processor 102 determines the characteristic of the case 132 via user input. For example, the sensor may comprise a touch sensor 108 and the sensor signal may comprise user input indicating a model, manufacturer, an attachment status, and/or other characteristic of the case 132. The processor 102 may determine the model, manufacturer, attachment status, and/or other characteristic of the case 132 based on the user input.

In some embodiments, the processor 102 determines the characteristic of the case 132 via one or more images of the case 132. For example, a user may orient a camera of the computing device 101 toward the case 132 and use the computing device 101 to take a picture of the case 132. The processor 102 may analyze the picture and determine, based on the picture, the model, manufacturer, and/or other characteristic of the case 132. Any number and combination of techniques can be used to determine the characteristic of the case 132.

In some embodiments, the processor 102 determines a characteristic comprising an attachment status or a proximity to the case 132. For example, the processor 102 may determine that the computing device 101 is coupled to the case 132 based at least in part on a button being pressed, a contact between electrodes occurring, an amplitude of a wireless communication exceeding a threshold, a RFID tag characteristic, or any combination of these. As another example, the processor 102 can determine that the computing device 101 is approaching the case 132 or proximate to the case 132 based on an amplitude of a wireless communication exceeding a threshold and/or a detection of a RFID tag proximate to the computing device 101.

In some embodiments, the case 132 can additionally or alternatively use any of the methods discussed above, e.g., with respect to block 402, for determining an attachment status. For example, the case 132 may comprise a button configured to be pressed when the computing device 101 is coupled to the case 132. In response to detecting that the button is pressed, the case 132 may determine that the computing device 101 is coupled to the case 132. In some embodiments, the case 132 may transmit a wired or wireless signal to the computing device 101 associated with the attachment status. The computing device 101 may determine, based on the signal, the attachment status.

The method 400 continues at step 406 when the processor 102 of the computing device 101 determines a haptic effect. In some embodiments, the processor 102 can determine the haptic effect using any of the methods discussed above with respect to step 304 of FIG. 3.

In some embodiments, the processor 102 is configured to determine a characteristic of the haptic effect based at least in part on the characteristic of the case 132. The characteristic of the haptic effect may comprise a type, location (e.g., on the user's body to which to output the haptic effect), duration, waveform, and/or trigger for the haptic effect.

For example, in some embodiments, the computing device 101 may execute a video game in which the user can control a virtual avatar. In response to determining an attachment status indicating that the computing device 101 is not coupled to the case 132 (e.g., is in the user's hands), the computing device 101 may output haptic effects in response to a first set of video game events, such as video game events that are not associated with the virtual avatar's head. For example, the computing device 101 may output haptic effects in virtual gunshots to the virtual avatar's chest and/or firing a virtual weapon. In response to determining an attachment status indicating that the computing device 101 is coupled to the case 132 (e.g., a headset), the computing device 101 may output haptic effects in response to a second set of video game events, such as those associated with the virtual avatar's head and/or face. For example, the computing device 101 may output haptic effects in response to the virtual avatar getting shot in the head, and/or the user's virtual character bumping his head on the ceiling while jumping. Thus, in some embodiments, the computing device 101 may change the events that trigger haptic effects based on whether or not the computing device 101 is coupled to the case 132 (e.g., the attachment status). This may provide a more realistic haptic experience, e.g., because the haptic effects that are output may be tailored based on whether the computing device 101 is in the user's hands or coupled to another body part of the user.

In some embodiments, the computing device 101 determines that the case 132 is associated with a particular model and/or manufacturer. The computing device 101 may determine a haptic effect based on the model and/or manufacturer. For example, that computing device 101 may determine that the model of case 132 does not include a certain type of haptic output device necessary to output a particular haptic effect. Thus, the computing device 101 may determine an alternative haptic effect, or no haptic effect at all.

In some embodiments, the computing device 101 may further determine one or more physical properties of the case 132 based at least in part on the characteristic of the case 132. The physical properties may comprise a material included within the case 132, a vibration-propagation characteristic (e.g., a physical model or transfer function) of the case 132, and/or another physical property. The computing device 101 may determine a haptic effect based on the one or more physical properties. For example, the computing device 101 may determine that the case 132 comprises a soft material that, e.g., substantially dampens vibrations propagating through the case 132. Based on this determination, computing device 101 may determine a haptic effect comprising, e.g., an increased amplitude. The increased amplitude may compensate for the dampening of the vibrations. Thus, in some embodiments, the computing device 101 can produce different haptic effects based on different models, manufacturers, physical characteristics, and/or other properties of the case 132.

In some embodiments, the computing device 101 is configured to determine a characteristic of a haptic effect based at least in part on a position of a haptic output device 140 of the case 132. For example, the computing device 101 may determine (e.g., based on a model, manufacturer, and/or other characteristic of the case 132) that a haptic output device 140 of the case 132 is configured to output haptic effects to a particular location on the user's body. Thus, the computing device 101 may determine a haptic effect should be output via the haptic output device 140 in response to an event associated with that location. For example, the computing device 101 may play a movie. And the haptic output device 140 of the case 132 may be configured to output haptic effects to a user's forehead. In response to a movie event comprising a movie character getting slapped in the forehead, the computing device 101 may cause the haptic output device 140 to output a haptic effect. In response to other movie events not associated with the forehead, the computing device 101 may use other haptic output devices (e.g., haptic output device 118) to output haptic effects, or may not output haptic effects at all. Thus, some embodiments may avoid outputting haptic effects that would be misleading or unrealistic to a user if output by the haptic output device 140, such as a haptic effect in response to a movie character being hit in the back of the head.

In some embodiments, the computing device 101 is configured to determine a characteristic of a haptic effect based at least in part on a proximity of the computing device 101 to the case 132 and/or a characteristic of a receptacle of the case 132. For example, the case 132 may comprise a receptacle with a curvature and/or other shape that the computing device 101 must conform to in order to couple with the case 132. In such an example, the computing device 101 may determine a haptic effect configured to deform the shape of the computing device 101 so that the computing device 101 can fit into the receptacle. For instance, the computing device 101 may determine a haptic effect configured to deform the computing device 101 into a curved shape that mimics a curvature of the receptacle.

In some embodiments, the computing device 101 determines a haptic effect based at least in part on an event. An event, as used herein, is any interaction, action, collision, or other event which occurs during operation of the computing device 101 which can potentially comprise an associated haptic effect. In some embodiments, an event may comprise user input or user interaction (e.g., a button press, manipulating a joystick, interacting with a touch-sensitive surface, tilting or orienting the computing device 101, positioning or performing a gesture with a user's hand, finger, and/or other body part in real space), a system status (e.g., low battery, low memory, or a system notification, such as a notification generated based on the system receiving an incoming call), sending data (e.g., sending an e-mail), receiving data (e.g., receiving a text message), performing a function using the computing device 101 (e.g., placing or receiving a phone call), or a program event (e.g., if the program is a game, a program event may comprise explosions, gunshots, collisions, interactions between game characters, advancing to a new level, or driving over bumpy terrain).

The method 400 continues at step 408 when the processor 102 of the computing device 101 transmits a signal to output the haptic effect. The processor 102 can use any of the methods described above, e.g., with respect to step 306 of FIG. 3, to determine and/or transmit the signal.

In some embodiments, the processor 102 transmits a haptic signal to the haptic output device 118 to output the haptic effect. Additionally or alternatively, the processor 102 may transmit a signal (via a wired or wireless interface) to the case 132 configured to cause the case 132 to output the haptic effect and/or a different haptic effect.

The method 400 continues at step 410 when the haptic output device 118 and/or the haptic output device 140 receives the signal and outputs the haptic effect. The haptic effect may comprise any of the haptic effects described above, e.g., with respect to step 308 of FIG. 3.

Figure 5:
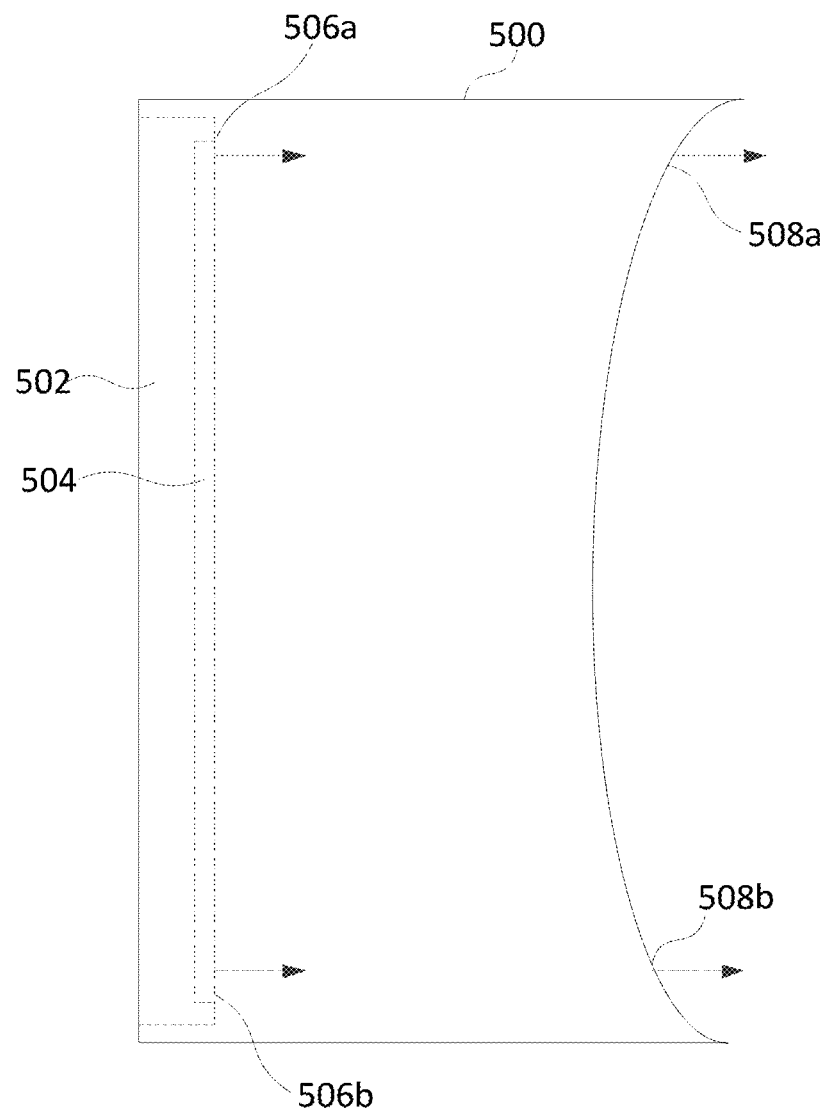
FIG. 5 a top perspective view of an embodiment of a case for providing haptic feedback according to another embodiment.

In some embodiments, the haptic output device 118 and/or 140 can output a haptic effect by deforming in shape. For example, as shown in FIG. 5, a computing device 502 is positioned within and removably coupled to a case 500 such that, e.g., a display 504 of the computing device 502 is oriented for viewing by a user. A haptic output device of the computing device 502 may output a haptic effect to the user by, e.g., causing a portion of the computing device 502 to deform. For example, the haptic output device may output the haptic effect by causing a corner 506a of the computing device 502 to bend in the direction shown by the dashed arrow. As the portion of the computing device 502 deforms, the computing device 502 may apply force to a corresponding portion of the case 500, such as a housing, pin, rod, bladder, and/or other component of the case 500. The component may be configured to transfer the force applied by the computing device 502 to the user. For example, the component may move and/or apply force to an interface surface 510 of the case 500 in response to the force from the computing device 502. This may cause at least a portion of the interface surface 510 to also deform in shape and/or apply force to the user. For example, the bending of the corner 506a of the computing device 502 may apply force to the case 500, causing a corresponding portion 508a of the interface surface 510 to deform in shape and/or apply force to the user. The user may perceive the deformation and/or force as a haptic effect.

In some embodiments, the computing device 502 can subsequently return to an un-deformed state (e.g., by bending the corner 506a back to a planar shape). This can remove force from the case 500, allowing the case 500 to also return to an un-deformed state. The user may perceive this return to an un-deformed state and/or lessening of force as a haptic effect.

In some embodiments, the computing device 502 can bend, twist, flex, and/or otherwise deform in multiple locations in sequence or in concert to output haptic effects to the user. For example, both ends of the computing device 502 can bend in the directions shown by the arrows, thereby causing multiple portions 508a, 508b of the interface surface 510 to deform in shape. This may cause the portions 508a, 508b of the interface surface 510 to apply forces to multiple locations on the user, e.g., multiple locations around the user's face. A user may perceive the forces as one or more haptic effects.

In some embodiments, a haptic output device of the case 500 can output deformation haptic effects. For example, the case 500 may actuate a haptic output device to cause portions of the interface surface 510 (e.g., portions 508a, 508b) to deform in shape. This deformation may apply force to one or more locations on the user, which the user may perceive as one or more haptic effects.

In some embodiments, deformations in the computing device 502, particularly the display 504, may cause images output on the display 504 to appear deformed and/or warped to the user. Some embodiments can counteract or account for the deformation and/or warping of the images, as described in greater detail below.

Figure 6:
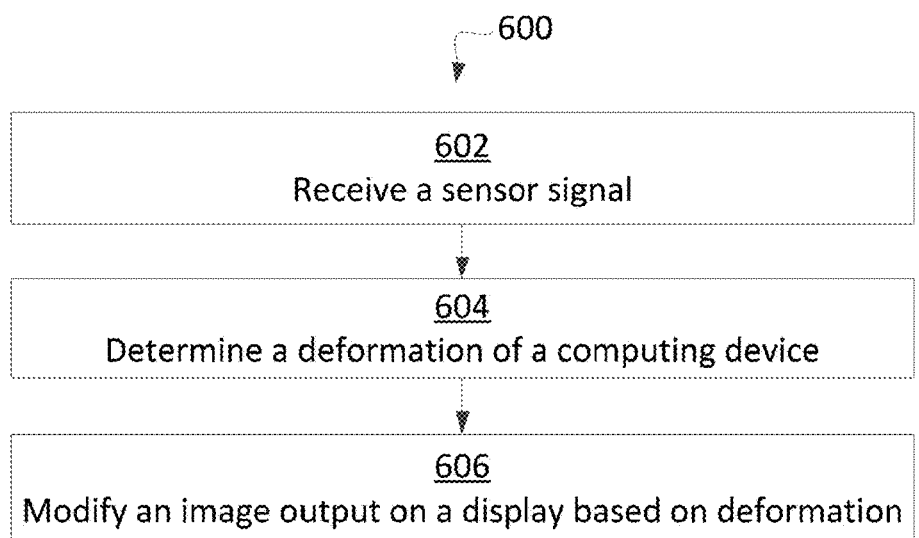
FIG. 6 is a flow chart of steps for providing haptic feedback via a case according to another embodiment.

FIG. 6 is a flow chart of steps for providing haptic feedback via a case according to another embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components shown in FIG. 1.

The method 600 begins at step 602 when a processor 102 of the computing device 101 receives a sensor signal from a sensor 130 (e.g., a strain gauge). For example, the computing device 101 may output one or more deformation haptic effects in response to one or more events. The deformation haptic effect may cause the computing device 101 to bend or flex. The sensor 130 may detect the bending or flexing and transmit one or more associated sensor signals to the processor 102.

The method 600 continues at step 604 when the processor 102 of the computing device 101 determines a deformation of the computing device 101 (e.g., an amount of bend in the computing device 101). In some embodiments, the processor 102 determines the deformation based at least in part on the sensor signal. For example, the processor 102 may map characteristics of the sensor signals (e.g., an amount of strain indicated by the sensor signals) to a particular deformation of the computing device 101 via a lookup table. Additionally or alternatively, the processor 102 may use one or more algorithms to determine a deformation of the computing device 101 based on sensor signals from the sensor 130. For example, the processor 102 may use an algorithm to determine a particular deformation of the computing device 101 based on an amount of strain detected by the sensor 130.

In some embodiments, the processor 102 determines the deformation based at least in part on a previously-output haptic effect. For example, the processor 102 may determine that a haptic effect comprising a deformation with particular characteristics was previously output. Based on the haptic effect, the processor 102 may determine the computing device 101 is deformed according to the particular characteristics.

The method 600 continues at step 606 when the processor 102 of the computing device 101 modifies an image output on a display 150 based on the deformation. The processor 102 may alter the image to counteract, account for, and/or otherwise reduce the impact of deformations in the computing device 101 on the image.

For example, in some embodiments, the computing device 101 may output, via display 150, a movie in which a character puts on goggles to go snorkeling. In response to the character putting on the goggles, the computing device 101 may output a haptic effect configured to simulate wearing goggles. For example, the outer perimeter of the computing device 101 may bend toward the user, thereby applying force to corresponding portions of the case 132, which in turn may apply force to the perimeter of the user's face (e.g., when the case 132 is a headset). The user may perceive the force around the perimeter of the user's face similarly to the force of goggles on the user's face. But, in such an embodiment, the curvature and/or bend of the computing device 101 may distort images output on the display 150. This may impact the ability of the user to view the remainder of the movie. In some embodiments, the processor 102 can determine, based on sensor signals from the sensor 130, a curvature in the computing device 101 and/or other characteristics of the deformation. The processor 102 can then modify the image to reduce the impact of the curvature and/or other characteristics of the deformation on images output by the display 150.

Additional Embodiments

Figure 7:
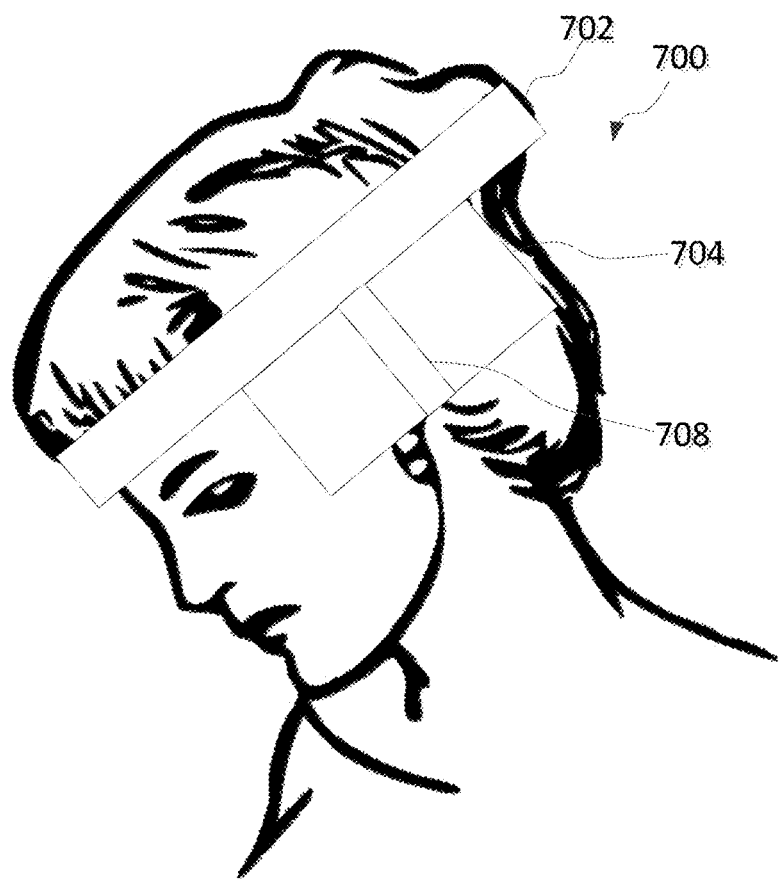
FIG. 7 shows another embodiment of a case for providing haptic feedback.

FIG. 7 shows another embodiment of a case 700 (e.g., a headset) for providing haptic feedback according to another embodiment. The case 700 and/or computing device 704 may comprise one or more features, or be configured according to one or more embodiments, discussed above with respect to FIGS. 1-6. For example, the case 700 may comprise one or more materials or devices configured to improve or optimize the transmission of vibrations through the case 700.

The case 700 comprises one or more attachment devices 702, e.g., for coupling the case 700 to the user's body (e.g., the user's head). An attachment device 702 may comprise any of the attachment devices described with respect to FIGS. 2A-B. For instance, the attachment device 702 may comprise a strap or band configured to wrap around the user's head. The case 700 also comprises one or more coupling devices 708 for removably coupling the computing device 214 to the housing 202. A coupling device 708 may comprise any of the coupling devices described with respect to FIGS. 2A-B. For instance, the attachment device 702 may comprise one or more clamps or elastic bands.

In the embodiment shown in FIG. 7, the case 700 is configured to position the computing device 704 proximate to a user's ear. This may allow a user to perceive audio output by the computing device 704. In alternative embodiments, the case 700 is configured to position the computing device 706 elsewhere around the user's head.

In some embodiments, the case 700 and/or computing device 704 outputs haptic effects to a portion of the user's head proximate to the location of the computing device 704. For example, in the embodiment shown in FIG. 7, the case 700 and/or computing device 704 may output haptic effects proximate to the user's ear. The haptic effects may correspond to or otherwise be associated with, e.g., audio events, game events, and/or other events occurring on the computing device 704. For example, the computing device 704 and/or case 700 may output a haptic effect in response to a virtual object in a video game contacting the ear of the user's virtual character. By outputting a haptic effect associated with the virtual character's ear proximate to the user's ear, the user may perceive a more realistic haptic experience.

In some embodiments, the case 700 is additionally or alternatively configured to couple with, and/or output haptic effects to, another portion of the user's body (e.g., the user's leg, arm, shoulder, back, chest, and/or foot). For example, the case 700 may comprise one or more attachment devices 702 configured to couple the case 700 to the user's arm. In such an embodiment, the case 700 and/or computing device 704 may output haptic effects to the user's arm. For example, the computing device 704 and/or case 700 may output a haptic effect to the user's arm in response to a virtual object in a video game contacting the arm of the user's virtual character. This may provide a more realistic haptic experience to the user.

Advantages of Providing Haptic Feedback Via a Case

There are numerous advantages to providing haptic feedback via a case. For example, some embodiments may allow computing devices (e.g., mobile devices) that are otherwise unable to output haptic feedback to output haptic feedback via the case. As another example, embodiments in which the case is a headset may provide a cheaper alternative than purchasing a dedicated virtual-reality headset. For instance, a user may be able to couple the user's existing mobile device to a headset constructed from cheap materials, such as cardboard, to create a virtual-reality headset. This may be significantly cheaper than, for example, purchasing a dedicated virtual-reality headset.

Some embodiments may provide a more realistic haptic experience for the user. For example, the computing device may cause the case to output haptic effects in response to video game events associated with a body part proximate to the case. The user may perceive the haptic effects as a more realistic simulation of the video game events than, e.g., if the haptic effects were output by the computing device itself.

Some embodiments may provide an enhanced haptic experience for the user. For example, the case may be constructed from one or more materials configured to amplify and/or more efficiently propagate haptic effects than, e.g., existing cases. Additionally or alternatively, the case may more firmly grip the computing device than, e.g., existing cases. This may allow haptic effects output by the computing device to more efficiently be transferred to the user, resulting in an improved haptic experience.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
a case configured to mechanically couple with a mobile device and position the mobile device such that the mobile device serves as a display for the case;
a sensor configured to detect an output from the mobile device and transmit a sensor signal associated with the output from the mobile device;
a processor coupled to the case and configured to:
receive the sensor signal;
generate a haptic signal based at least in part on a characteristic of the case and the sensor signal from the sensor; and
transmit the haptic signal; and
a haptic output device in communication with the processor and configured to receive the haptic signal and output a haptic effect in response to the haptic signal.

2. The system of claim 1, wherein the case comprises a material positioned to contact the mobile device and transmit vibrations from the mobile device to a housing of the case, the material configured to resonate at a frequency of the vibrations.

3. The system of claim 1, wherein the case comprises a material configured to contact a surface of the mobile device and extend through a housing of the case to an interface of the case that is configured to contact a user's body, the material comprising metal or hard plastic.

4. The system of claim 3, wherein the material comprises a spring, rod, or pin, and wherein a first end of the material is configured to contact the surface of the mobile device and a second end of the material is configured to contact the user's body.

5. The system of claim 4, wherein the material is configured to contact a location on the surface of the mobile device that is positioned proximate to a haptic actuator disposed within the mobile device.

6. The system of claim 1, wherein the case includes a fastening component configured to grip the mobile device with an amount of force above a threshold, the fastening component comprising a screw, spring, groove, or elastic band.

7. The system of claim 1, wherein the sensor is positioned on the case, and wherein the characteristic of the case is an attachment status between the mobile device and the case.

8. The system of claim 1, wherein the processor is positioned on the case, the haptic output device is positioned on the case, and the sensor comprises an accelerometer.

9. The system of claim 1, wherein the output is audio or video output from the mobile device, the sensor is configured to detect the audio or video output from the mobile device, the sensor signal is associated with the audio or video output.

10. The system of claim 1, wherein the case comprises a wearable device configured to be worn.

11. The system of claim 10, wherein the case comprises a headset.

12. The system of claim 1, wherein the haptic effect is configured to be localized to a particular portion of a user's head.

13. A mobile device comprising:
a housing;
a display coupled to the housing;
a memory; and
a processor in communication with the memory and the display, the processor disposed within the housing and configured to:
receive a sensor signal from a sensor;
determine a characteristic of a case based on the sensor signal, wherein the case is a headset configured to mechanically couple with the mobile device and position the mobile device such that the mobile device serves as a display for the headset;
determine a haptic effect using the characteristic of the case; and
cause the haptic effect to be output by a haptic output device.

14. The mobile device of claim 13, wherein the characteristic of the case comprises an attachment status between the mobile device and the case.

15. The mobile device of claim 13, wherein the characteristic comprises a model, manufacturer, hardware component, or software component of the case.

16. The mobile device of claim 13, wherein the characteristic comprises a location on a body part to which the case is configured to output the haptic effect.

17. The mobile device of claim 13, further comprising the sensor and the haptic output device.

18. The mobile device of claim 17, wherein the sensor comprises a first sensor and the sensor signal comprises a first sensor signal, and further comprising a second sensor, wherein the processor is further configured to:
receive a second sensor signal from the second sensor;
determine an amount of bend present in the mobile device based on the second sensor signal; and
modify an image output on the display of the mobile device based on the amount of bend present in the mobile device.

19. The mobile device of claim 13, wherein the haptic effect comprises a deformation haptic effect configured to cause the mobile device to bend.

20. A method comprising:
receiving, by a mobile device, a sensor signal from a sensor;
determining, by the mobile device, a characteristic of a case based on the sensor signal, wherein the case is a headset configured to mechanically couple with the mobile device and position the mobile device such that the mobile device serves as a display for the headset;
determining, by the mobile device, a haptic effect using the characteristic of the case; and
causing, by the mobile device, the haptic effect to be output by a haptic output device.

21. The method of claim 20, wherein the characteristic comprises an attachment status between the mobile device and the case.

22. The method of claim 20, further comprising:
outputting the haptic effect to a location on a user's body by causing the mobile device to bend in an amount configured to apply a force to the case, the force configured to cause a portion of the case to deform and contact the location on the user's body.

23. The method of claim 20, wherein the sensor comprises a first sensor and the sensor signal comprises a first sensor signal, and further comprising:
receiving a second sensor signal from a second sensor;
determining an amount of bend present in the mobile device based on the second sensor signal; and
modifying an image output on a display of the mobile device based on the amount of bend present in the mobile device.

24. A non-transitory computer-readable medium comprising program code, which when executed by a processor of a mobile device is configured to cause the processor to:
- receive a sensor signal from a sensor;
- determine a characteristic of a case based on the sensor signal, wherein the case is a headset configured to mechanically couple with the mobile device and position the mobile device such that the mobile device serves as a display for the headset;
- determine a haptic effect using the characteristic of the case; and
- cause the haptic effect to be output by a haptic output device.

25. The non-transitory computer-readable medium of claim 24, wherein the characteristic comprises an attachment status between the mobile device and the case.

26. The non-transitory computer-readable medium of claim 24, further comprising program code which when executed by the processor is configured to cause the processor to:
- cause the haptic effect to be output to a specific location on a user's body by causing the haptic output device to bend in an amount configured to apply a force to the case, the force configured to cause a portion of the case to deform and contact the specific location on the user's body.

27. The non-transitory computer-readable medium of claim 24, wherein the sensor comprises a first sensor and the sensor signal comprises a first sensor signal, and further comprising program code which when executed by the processor is configured to cause the processor to:
- receive a second sensor signal from a second sensor;
- determine an amount of bend present in the mobile device based on the second sensor signal; and
- modify an image output on a display of the mobile device based on the amount of bend present in the mobile device.

* * * * *